United States Patent
Kelly et al.

(10) Patent No.: US 8,011,598 B2
(45) Date of Patent: *Sep. 6, 2011

(54) SOFC POWER SYSTEM WITH A/C SYSTEM AND HEAT PUMP FOR STATIONARY AND TRANSPORTATION APPLICATIONS

(75) Inventors: Sean Michael Kelly, Pittsford, NY (US); Gary Blake, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,967

(22) Filed: Sep. 16, 2009

(65) Prior Publication Data

US 2010/0003552 A1 Jan. 7, 2010

Related U.S. Application Data

(63) Continuation-in-part of application No. 11/787,998, filed on Apr. 18, 2007.

(51) Int. Cl.
*H01M 8/04* (2006.01)
*H01M 8/02* (2006.01)

(52) U.S. Cl. ......... 237/12.1; 237/2 B; 62/236; 62/238.7; 62/324.1; 429/436; 429/479; 429/488

(58) Field of Classification Search .................. 237/2 B, 237/12.1; 60/320; 62/238.7, 236, 324.1, 62/324.2; 492/12, 26, 433, 434, 435, 436, 492/479, 488, 489, 495, 496; *H01M 8/02, H01M 8/04*

See application file for complete search history.

(56) References Cited

U.S. PATENT DOCUMENTS

| | | | | |
|---|---|---|---|---|
| 2,713,995 | A * | 7/1955 | Arkoosh et al. | 165/258 |
| 3,421,339 | A * | 1/1969 | Volk et al. | 62/159 |
| 4,196,526 | A * | 4/1980 | Berti | 34/77 |
| 4,523,438 | A * | 6/1985 | Curti | 62/238.6 |
| 4,660,761 | A * | 4/1987 | Bussjager | 237/2 B |
| 5,020,320 | A * | 6/1991 | Talbert et al. | 62/238.7 |
| 5,345,786 | A * | 9/1994 | Yoda et al. | 62/476 |
| 5,509,274 | A * | 4/1996 | Lackstrom | 62/238.4 |
| 5,933,988 | A * | 8/1999 | Adler | 38/44 |

(Continued)

FOREIGN PATENT DOCUMENTS

DE 10002942 7/2000

(Continued)

OTHER PUBLICATIONS

European Patent Office, European Search Report dated Jul. 2, 2009 for Application No. 08153589.0-1227/1983596.

*Primary Examiner* — Steven B McAllister
*Assistant Examiner* — Daniel E Namay
(74) *Attorney, Agent, or Firm* — Thomas N. Twomey

(57) ABSTRACT

An improved CHP system combining a VCCHP system with an SOFC system for application as a combined CHP system wherein the compressor motor of a heat pump is powered by a portion of the electricity generated by the SOFC, and wherein the thermal output of the heat pump is increased by abstraction of heat from the SOFC exhaust. This integration allows for complementary operation of each type of system, with the benefits of improved overall fuel efficiency for the improved CHP system. The heat pump is further provided with a plurality of flow-reversing valves and an additional heat exchanger, allowing the heat pump system to be reversed and thus to operate as an air conditioning system.

10 Claims, 4 Drawing Sheets

U.S. PATENT DOCUMENTS

| | | | |
|---|---|---|---|
| 5,941,089 A * | 8/1999 | Takaishi et al. | 62/324.2 |
| 6,370,903 B1 | 4/2002 | Wlech | |
| 6,668,572 B1 * | 12/2003 | Seo et al. | 62/238.6 |
| 6,688,129 B2 * | 2/2004 | Ace | 62/260 |
| 6,723,459 B2 * | 4/2004 | Strohle et al. | 429/13 |
| 6,769,481 B2 * | 8/2004 | Yoshimura et al. | 165/240 |
| 6,913,067 B2 * | 7/2005 | Hesse | 165/43 |
| 7,045,229 B2 * | 5/2006 | Kobayashi et al. | 429/414 |
| 7,063,137 B2 * | 6/2006 | Kadle et al. | 165/202 |
| 7,140,427 B2 * | 11/2006 | Honda et al. | 165/202 |
| 7,530,390 B2 * | 5/2009 | Feuerecker et al. | 165/202 |
| 2002/0114985 A1 * | 8/2002 | Shkolnik et al. | 429/20 |
| 2003/0138688 A1 * | 7/2003 | Hattori et al. | 429/34 |
| 2005/0022550 A1 * | 2/2005 | Yoshii et al. | 62/438 |
| 2006/0124275 A1 | 6/2006 | Gosse et al. | |
| 2006/0150652 A1 * | 7/2006 | Choi et al. | 62/238.6 |
| 2007/0172707 A1 * | 7/2007 | Hoffjann et al. | 429/9 |
| 2008/0028766 A1 * | 2/2008 | Masada | 60/784 |
| 2008/0197206 A1 * | 8/2008 | Murakami et al. | 237/2 B |
| 2008/0261093 A1 | 10/2008 | Kelly et al. | |

FOREIGN PATENT DOCUMENTS

| | | |
|---|---|---|
| DE | 10133733 | 1/2003 |
| EP | 823742 A1 * | 2/1998 |
| JP | 2006024430 A * | 1/2006 |
| WO | WO 03012348 | 2/2003 |

* cited by examiner

SOFC POWER SYSTEM WITH A/C SYSTEM AND HEAT PUMP FOR STATIONARY AND TRANSPORTATION APPLICATIONS

RELATIONSHIP TO OTHER APPLICATIONS AND PATENTS

The present application is a Continuation-In-Part of a pending U.S. patent application Ser. No. 11/787,998, filed Apr. 18, 2007, now published as Published US Patent Application No. US 2008/0261093 A1, the relevant disclosure of which is incorporated herein by reference.

STATEMENT REGARDING FEDERALLY SPONSORED RESEARCH OR DEVELOPMENT

This invention was made with United States Government support under Government Contract/Purchase Order No. DE-FC36-04GO14319. The Government has certain rights in this invention.

TECHNICAL FIELD

The present invention relates to fuel cells; more particularly, to an Auxiliary Power Unit (APU) including a solid oxide fuel cell (SOFC) system; and most particularly, to a Combined Air Conditioning (A/C), Heat, and Power (CACHP) system for producing electric power, air conditioning, and heating through combination of an SOFC system and a reversible Vapor-Compression-Cycle Heat Pump (VC-CHP).

BACKGROUND OF THE INVENTION

Solid Oxide Fuel Cell systems are high-efficiency generators of electric power from a variety of fuels including Natural Gas, Liquefied Petroleum Gas (LPG), Ethanol, and other hydrocarbon and non-hydrocarbon fuels. Due to the high operating temperature of an SOFC (700° C.-900° C.), the tail pipe exhaust is generally also at a high temperature. A known state-of-the-art integration of SOFC systems is as part of a Combined Heat and Power (CHP) system. Prior art CHP systems use the electrical output of the SOFC system directly, and also utilize the energy leaving the SOFC system in the form of hot exhaust for heating air or water for space heating or for heating water for domestic usage (showers, etc.). No fuel cell system is 100% efficient, so there will always be heat leaving in the SOFC exhaust. For a typical 1 kW electrical service demand (e.g., a small residence), the heating or thermal needs are typically in the range of 5-10 kW. If the SOFC system has a reasonably good electrical efficiency, for example 33%, the heat output for 1 kW net electric output is 2 kW. Since 2 kW is much less thermal energy than desired, auxiliary direct-fueled condensing or non-condensing burner-heat exchangers are commonly used to make up the difference. The best of these are 80-90% efficient in converting fuel to electric and thermal energy. In transportation (heavy-duty truck) applications, a direct fuel-fired heater is usually employed to provide heat to the sleeper cab. The fuel consumed for the fuel fired heater is used only for heating, and these units are typically 80-95% efficient.

Further, in many applications employing CHP systems for heating and power, it is desirable that air cooling (air conditioning) also be made available.

What is needed in the art is an improved CHP system with increased overall fuel efficiency that is capable of providing both heating and cooling.

It is a principal object of the present invention to increase the fuel efficiency of CHP systems while providing alternatively both heating and cooling of an effluent.

SUMMARY OF THE INVENTION

Briefly described, the invention seeks to improve the overall efficiency of a CHP system with respect to conversion of fuel energy to usable heating, cooling, and electrical energy. In addition, method and apparatus are presented to flexibly close the gap between thermal energy available vs. thermal energy demand without the need for an accessory burner-heat exchanger system. Still further, a method and apparatus are presented that allows for generation of chilled water or air conditioning.

The invention is directed to an improved CHP system which combines a VCCHP system with an SOFC system for application as a combined CHP system wherein the compressor motor of a heat pump is powered by a portion of the electricity generated by the SOFC, and wherein the thermal output of the heat pump is increased by abstraction of heat from the SOFC exhaust. This integration allows for novel and complementary operation of each type of system, with the benefits of improved overall fuel efficiency for the improved CHP system. The heat pump is further provided with flow-reversing valves, a refrigerant bypass valve, and an additional condenser, allowing the heat pump system to be reversed and thus to operate as an air conditioning system.

BRIEF DESCRIPTION OF THE DRAWINGS

The present invention will now be described, by way of example, with reference to the accompanying drawings, in which.

Figure 1:
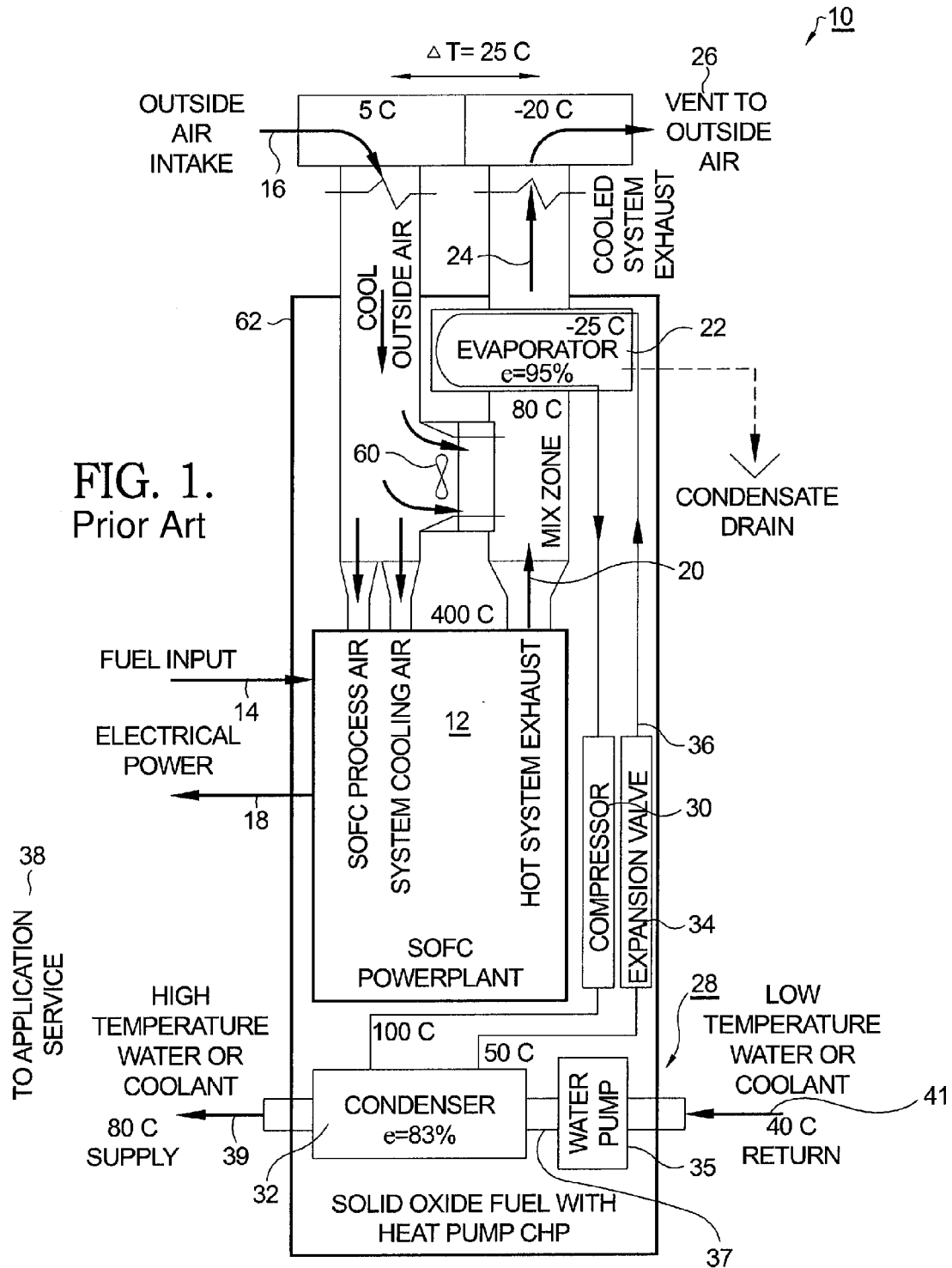
FIG. 1 is a schematic drawing of a CHP system substantially as disclosed in FIGS. 1-3 in Published US Patent Application No. US 2008/0261093 A1, wherein the evaporator section of a VCCHP is interfaced with SOFC exhaust which is tempered by mixing with intake system process air.

Corresponding reference characters indicate corresponding parts throughout the several views. The exemplifications set out herein illustrate currently preferred embodiments of the invention, and such exemplifications are not to be construed as limiting the scope of the invention in any manner. Temperatures referenced on the figures are for reference only and are subject to the specific design of system components and operating conditions.

DESCRIPTION OF THE PREFERRED EMBODIMENTS

Referring to FIG. 1, a prior art CHP system 10, as disclosed in Published US Patent Application No. US 2008/0261093 A1, is shown. A solid oxide fuel cell system 12 as is well known in the fuel cell arts is provided with a supply of fuel 14 and air 16. Fuel 14 is typically a hydrogen-rich reformate formed conventionally by a catalytic reformer (not shown) from a liquid or gaseous supply of a hydrocarbon such as, for example, an alkane or alcohol. It is also known to fuel an SOFC directly with ammonia, obviating the need for a reformer. SOFC 12 provides electric power 18 and also emits a hot exhaust 20 comprising heated cathode air and anode tailgas, or a hot combustion product of the two, that is directed through one side of a heat exchanger such as evaporator 22, creating a partially-cooled exhaust 24 that may be discharged to atmosphere 26.

A VCCHP system 28 includes conventionally a compressor 30; a heat exchanger condenser 32; an expansion valve 34; the aforementioned heat exchanger evaporator 22; and a suitable first fluid working medium 36. As used herein, a "working" medium is a fluid medium recirculated in a closed loop and present as either a gas or a liquid depending upon conditions of temperature and pressure. The working medium is pumped as a gas through a first side of heat exchanger condenser 32 wherein the medium is condensed to a heated liquid wherein the heat of vaporization is recovered. A second fluid medium 37, also referred to herein as a thermal transfer medium, is pumped by a recirculation pump 35 through the second side of heat exchanger/condenser 32, abstracting heat from the hot first fluid working medium 36, and thence through a customer application 38 requiring heated fluid reservoir 39, for example, hot air, hot water, or hot refrigerant. The second fluid medium 37 may be provided in a closed system wherein heat is extracted therefrom in customer application 38 and the medium is then returned through low temperature fluid reservoir 41 for reheating; or application 38 may consume the heated second working medium, in which case fresh cold medium is supplied to pump 35.

For a heat pump system, a coefficient of performance (COP) is defined as the heat output to the high temperature reservoir divided by the heat, or work, driven into the refrigerant by the compressor. COPs for good heat pump systems are typically between 2 and 3. This means that 2 to 3 times the electric power (minus motor losses) driven to the compressor is driven to the high temperature reservoir (air, coolant, or water). This is a primary efficiency improvement for the utilization of fuel power to heat power.

Where constant massflow of coolant or air is desired at a prescribed temperature, the heat pump compressor may be driven at variable speed to adjust the heating load depending on demand or operating conditions. By this method, a simple control is obtained for either constant temperature or constant massflow heating needs under variable electric or thermal demand or environmental conditions.

A key feature is the integration of the heat exchanger for evaporator 22 with the process air inlet and exhaust streams 16,24, respectively, of the device. Thus, heat from SOFC exhaust 20 is entered into the heat pump through extraction by evaporator 22.

An SOFC system normally intakes both process air and auxiliary cooling air (cabinet, electronic, and space cooling) from an external source and vents the hot exhaust to a suitable outside air space. The evaporator also draws heat out of the process air 16 coming into the system via fan 60. This low temperature air 16 is used for cooling and SOFC system operation. The lower temperature process air intake improves the efficiency of the SOFC air pumps and blowers as well as improving the cooling of onboard electronics and other devices. The heat entering evaporator 22 from this stream becomes available to the application at the condenser 32 through the heat pump system operation. The hot system exhaust stream 20 also travels through evaporator 22 giving additional heat input to the heat pump process. This integration allows for access to the low temperature heat source in the outside air without having to place an evaporator outside of the system or appliance boundary 62, or directly outdoors. The mixture of outside air 16 via fan 60 and system exhaust 20 provides an intermediate temperature airstream through evaporator 22. This provides for an increase in heat pump COP and better temperature compatibility in the evaporator using conventional refrigerants. This integration also improves system cooling and allows for efficient use of system exhaust heat. The specifics of the ducting and heat exchanger technology are not critical, but use of well-designed inlet and outlet ducts and multi-pass heat exchangers enhances the functionality and performance.

All of the foregoing prior art is disclosed in Published US Patent Application No. US 2008/0261093 A1.

Figure 2:
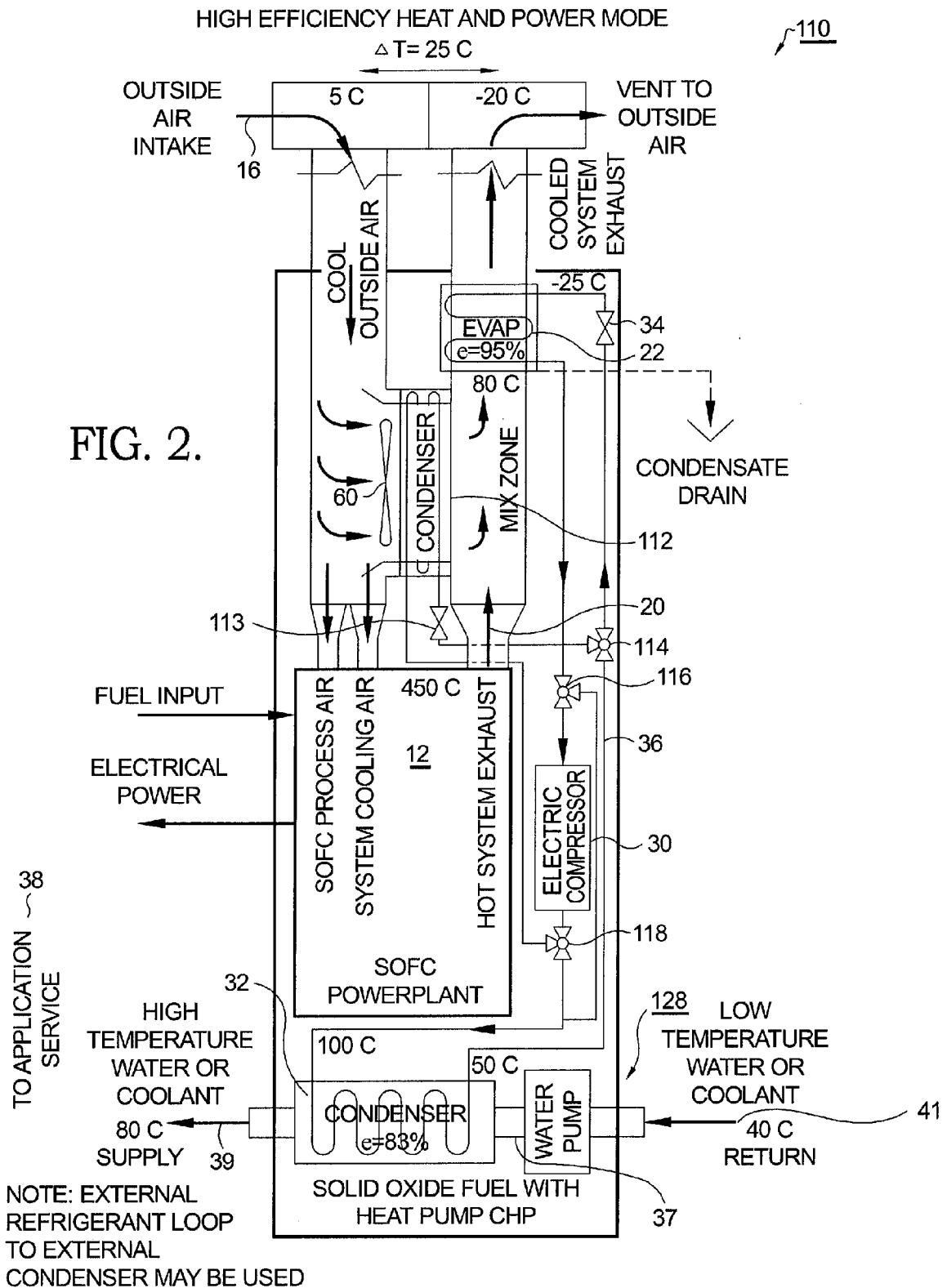
FIG. 2 is a schematic drawing of a CHP system in accordance with the present invention, similar to the prior art system shown in FIG. 1 but with the addition of flow-reversing valves, a refrigerant bypass valve, and an additional condenser, allowing the heat pump system to be reversed and thus to operate as an air conditioning system, showing the heat pump system in heat pumping mode.
Figure 3:
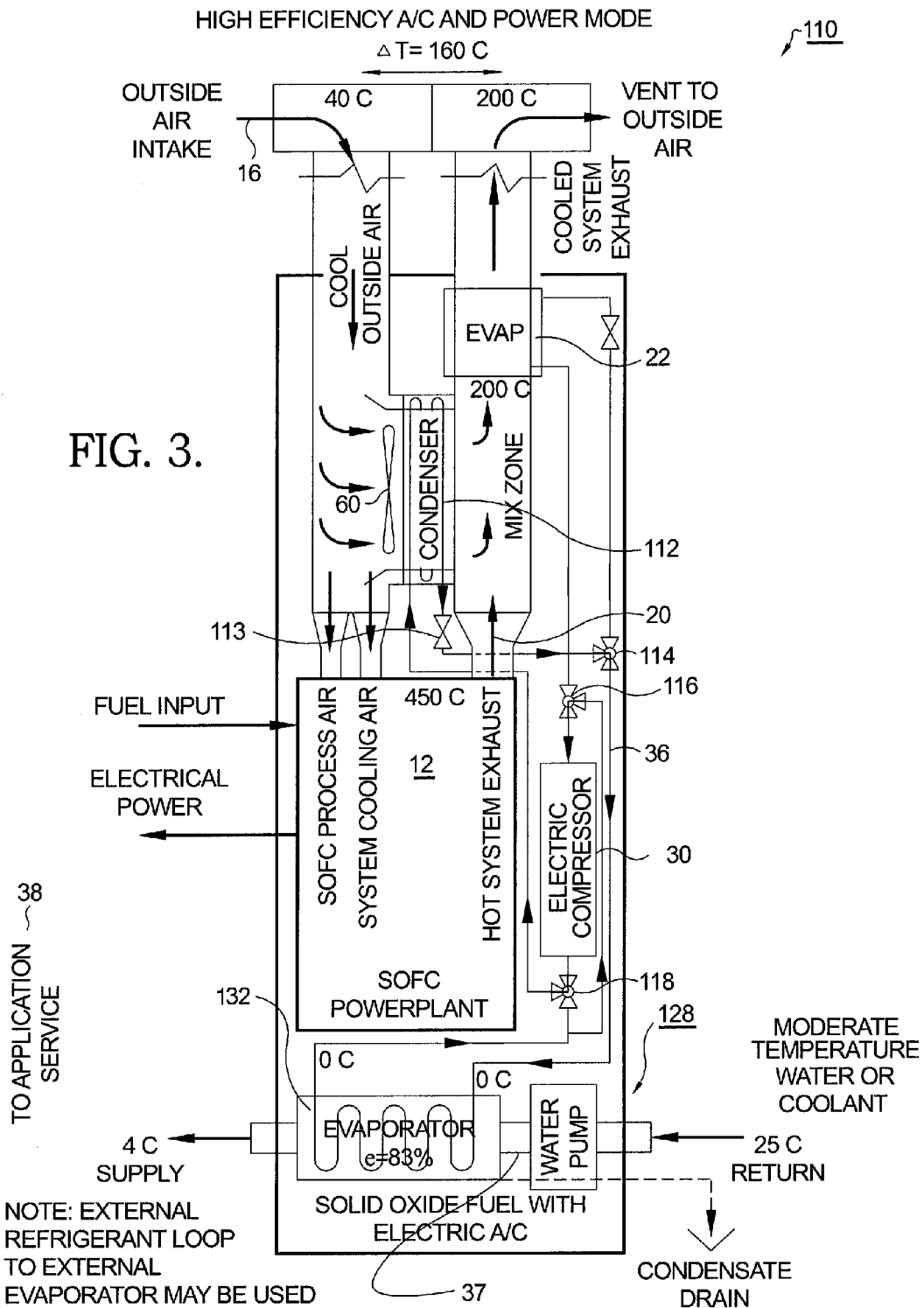
FIG. 3 is a schematic drawing like that shown in FIG. 2, showing the heat pump system in air conditioning mode.

Referring now to FIGS. 2 and 3, the improvement in accordance with the present invention in providing an improved CHP system 110 comprises a Reversing Vapor-Compression-Cycle Heat Pump 128 including an additional heat exchanger operating as a second condenser 112 disposed downstream of fan 60, expansion valve 113, and three-way valves 114,116, 118 disposed in the flow path selectively connecting condenser 112, evaporator 22, and condenser 32, allowing the heat-pump system to reverse and operate as an air conditioning system. The heat pump and air conditioning system in 128 is of a conventional vapor compression cycle type with a suitable refrigerant. Compressor 30 may be powered by SOFC system 12. The heat pump system requires ambient air 16 to be mixed with the system exhaust 20 (driven with a fan) to improve heat pump operational efficiency and cool the SOFC exhaust to temperatures reasonable for most refrigerants.

Referring to FIG. 2, in Heating Mode, second condenser 112 is bypassed and, after working medium 36 passes through expansion valve 34, heat pump system 128 drives evaporator 22 to a temperature below the temperature of the intake air (ambient air) 16 mixed with SOFC system exhaust 20. This causes heat to flow from the mixture of ambient air and system exhaust to the refrigerant (first fluid working medium 36). The compression of working medium 36 by compressor 30 increases the temperature of the refrigerant to a temperature above the temperature of second fluid thermal transfer medium 37, by utilizing some of the electric output of the SOFC system. The high temperature refrigerant then passes through first condenser 32 which transfers heat to second fluid thermal transfer medium 37 for heating, for example, space heating air, or coolant or water for circulation heating 38. A separate water loop (not shown) may be channeled through the condenser to handle domestic water needs (showers, drinking, etc.). In this way, heat from incoming air 16, compressor power and hot exhaust 20 are channeled to the high temperature reservoir 39 (coolant, water, or air). The amount of heat transferred from the low temperature reservoir 41 to the high temperature reservoir 39 is a function of the amount of compression power and system COP (assuming non-limiting cases in heat exchangers etc.).

The heat pump compressor may be driven at variable speed to adjust the heating load depending on demand, or operating conditions. By this method, high electrical demand or high thermal demands may be met by adjusting the power level to the electric compressor. Heating Mode operation shown in FIG. 2, wherein second condenser 112 is bypassed, is substantially the same as the heating mode shown in FIG. 1.

Referring to FIG. 3, a novel feature of the present invention is the addition of compressor flow-reversing valves 116,118, refrigerant bypass valve 114, and an additional heat exchanger—second condenser 112, allowing system 110 to operate in Air Conditioner (A/C) Mode. Refrigerant flow through compressor 30 is reversed from that shown in FIG. 2 and the condenser 32 used in the heat pump becomes an evaporator 132 and now operates with a cooling effect on second fluid thermal transfer medium 37 for use by application 38. First evaporator 22 is bypassed, and heat is rejected from second condenser 112 to the ambient air 16 before mixing with the SOFC exhaust. This gives the most effective condenser heat rejection as it does not have SOFC hot exhaust mixed into the stream as in heat pump first evaporator 22.

Figure 4:
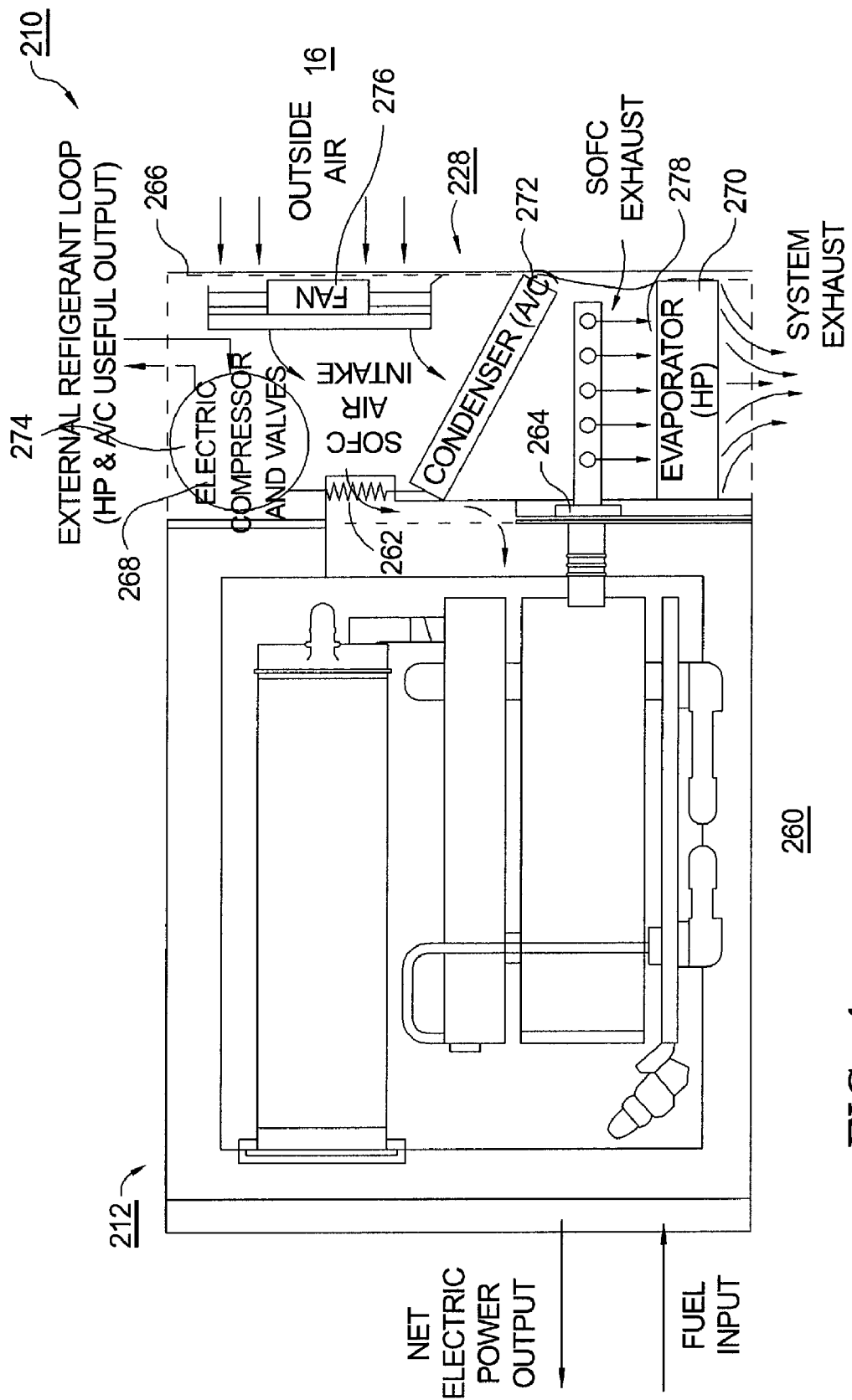
FIG. 4 is a top schematic view of an integrated CACHP system suitable for stationary or portable use as on a vehicle.

To serve the demands of power and climate control for transportation applications (heavy-duty truck, military), an exemplary arrangement 228 of a heating and air conditioning unit 210 is shown in FIG. 4. An SOFC system 212 is mounted on a support rail for a transportation application. This SOFC system has all provisions for operation on a vehicle 260 utilizing either liquid (diesel) or gaseous (natural gas, LPG, hydrogen) fuel. The air intake 262 and exhaust 264 of the SOFC system are along the rear face of unit 212. An auxiliary enclosure 266 may be used to house electric compressor 268, heat-pump evaporator 270, and A/C condenser 272, and refrigerant valves 274. The refrigerant lines that serve the evaporator (HP)/condenser (A/C) 270,272 are routed outside of this system to an external heat exchanger (not shown) that can be used for application climate control (heating and cooling effect). This is equivalent to condenser/evaporator 32 in FIGS. 2 and 3.

In operation, external ambient air 16 is pushed into the system with a conventional fan 276 into enclosure 266. A portion of this ambient air may be drawn into the SOFC system at this point. An additional feature that may be added to the embodiment is to allow the lines containing low pressure saturated-liquid/vapor phase refrigerant returning from the A/C condenser and expansion valve to exchange heat with the intake air of the SOFC system. This effectively cools the intake air of the SOFC system which improves system efficiency. The bulk of the airstream then passes through condenser 272 (active in A/C mode) where heat may be rejected from the air conditioning system to the air stream. After passing through the condenser, ambient air 16 is mixed with the SOFC system hot exhaust. This mixed stream 278 then passes through evaporator 270 (active in Heating Mode but deactive in Cooling Mode) wherein the heat in the ambient air and from the SOFC system is recovered for Heating Mode.

Note that the temperatures referred to in the figures are exemplary only and are subject to the specific design of system components and operating conditions.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A power system for generating electricity and for heating and cooling a thermal carrier medium, comprising:
   a) a solid oxide fuel cell system provided with a stream of intake air, said fuel cell system configured for generating electricity and an exhaust stream; and
   b) a heat pump system configured for operating in either a heating mode or a cooling mode, wherein said heat pump system includes a working medium, a compressor for pressurizing said working medium, a first heat exchanger configured for exchanging heat with said thermal transfer medium, a second heat exchanger configured for exchanging heat with g portion of said stream of intake air in said cooling mode such that said portion of said stream of intake air is combined with said exhaust stream after passing through said second heat exchanger, an evaporator disposed in said fuel cell exhaust stream configured for vaporizing and heating said working medium in said heating mode, and at least one valve configured for bypassing said second heat exchanger when operating in said heating mode and for bypassing said evaporator when operating in said cooling mode, wherein said heat pump system selectively operates in said heating and cooling modes.

2. A system in accordance with claim 1 wherein said compressor includes an electric motor powered by a portion of said fuel cell system-generated electricity.

3. A system in accordance with claim 1 wherein said system is further provided with a path for selectably diverting a portion of said intake air stream into said exhaust stream to form a mixture thereof, and wherein said evaporator is disposed in a flow stream of said mixture.

4. A system in accordance with claim 3 wherein said second heat exchanger is disposed in said selectably diverted portion of said intake air stream.

5. A system in accordance with claim 1 further comprising a vehicle equipped with said solid oxide fuel cell system and said heat pump system defining a portable auxiliary power unit.

6. In a combined heat and power system for generating electricity and for selectively heating and cooling a thermal transfer medium wherein the system includes a solid oxide fuel cell system and a heat pump system powered by said solid oxide fuel cell system, wherein said solid oxide fuel cell system is provided with a stream of intake air and produces an exhaust stream, and wherein said heat pump system includes a working medium, a compressor, first and second heat exchangers, an evaporator, and at least one valve for selective flow of said working medium between said heating mode and said cooling mode,
   a method for operating the combined heat and power system in said heating mode, comprising the steps of:
   a) setting said at least one valve for flow of said working medium to bypass said second heat exchanger and to pass said working medium from said compressor through said first heat exchanger before passing said working medium through said evaporator;
   b) pressurizing said working medium in said compressor to increase a temperature of said working medium;
   c) passing said working medium having said increased temperature through a side of said first heat exchanger while passing said thermal carrier medium through an opposite side of said first heat exchanger to heat said thermal carrier medium;
   d) passing said working medium exiting from said first heat exchanger through said evaporator disposed in an exhaust stream of said solid oxide fuel cell to heat said working medium; and
   e) returning said heated working medium to said compressor; and
   f) passing a portion of said intake air through said second heat exchanger to said exhaust stream.

7. A method in accordance with claim 6 wherein incoming air for said solid oxide fuel cell system is mixed with said exhaust stream before passing said cooled working medium through said evaporator.

8. A method in accordance with claim 6 including a further step of passing said working medium through an expansion valve.

9. In a combined heat and power system for generating electricity and for selectively heating and cooling a thermal carrier medium wherein the system includes a solid oxide fuel cell (SOFC) system receiving air from an intake stream and a heat pump system powered by said solid oxide fuel cell system, wherein said heat pump system includes a working medium, a compressor, first and second heat exchangers, an evaporator, and at least one valve for selective flow of said working medium between said heating mode and said cooling mode,
  a method for operating the combined heat and power system in said cooling mode, comprising the steps of:
  a) setting said at least one valve for flow of said working medium to bypass said evaporator and to pass said working medium from said compressor through said second heat exchanger before passing said working medium through said first heat exchanger;
  b) pressurizing said working medium in said compressor;
  c) passing said working medium from said compressor through a side of said second heat exchanger while said intake air is passed through an opposite side of said second heat exchanger to an exhaust stream of said SOFC to cool said working medium;
  d) passing said working medium exiting from said second heat exchanger through a first side of said first heat exchanger while passing said thermal carrier medium through a second side of said first heat exchanger to cool said thermal carrier medium; and
  e) returning said working medium to said compressor.

10. A method in accordance with claim 9 including a further step of passing said working medium through an expansion valve.

* * * * *